United States Patent [19]

Iwasaki

[11] 4,336,657
[45] Jun. 29, 1982

[54] POSITION SENSOR

[75] Inventor: Shinichiro Iwasaki, Auburn Heights, Mich.

[73] Assignee: Aisin Seiki Company, Limited, Kariya, Japan

[21] Appl. No.: 182,696

[22] Filed: Aug. 29, 1980

[51] Int. Cl.³ .............................................. G01B 7/24
[52] U.S. Cl. ................... 33/174 L; 33/149 J; 33/148. D; 33/DIG. 13
[58] Field of Search ............ 33/174 L, 169 R, 172 E, 33/DIG. 5, 148 D, DIG. 13, 149 J; 73/763, 767, 775

[56] References Cited

U.S. PATENT DOCUMENTS

| | | | |
|---|---|---|---|
| 2,627,119 | 2/1953 | Graham | 33/172 E |
| 3,166,852 | 1/1965 | Whitney | 33/172 E |
| 3,429,047 | 2/1969 | Redpath | 33/172 E |
| 3,466,926 | 9/1969 | Ruppenisit et al. | 73/775 |
| 3,534,479 | 10/1970 | Evans | 33/148 D |
| 3,807,223 | 5/1974 | Jullerat et al. | 73/DIG. 2 |
| 4,200,986 | 5/1980 | Ackerman et al. | 33/DIG. 13 |

FOREIGN PATENT DOCUMENTS 728345  12/1966  Italy .............................. 33/DIG. 13

*Primary Examiner*—Willis Little
*Attorney, Agent, or Firm*—Oblon, Fisher, Spivak, McClelland & Maier

[57] ABSTRACT

A position sensor comprising a movable member functionally connected with an operative device and moving in response to a positional displacement of the operative device, a displacement-pulse phase conversion unit including a magnetically soft amorphous metal member undergoing stress variations produced by the displacement of the movable member and an electrical coil wound on the magnetically soft amorphous metal member. A pulse voltage is applied to one end of the electrical coil, the other end of which is connected in series with a resistor. A voltage across the resistor is detected, and a time lag of the resistor voltage with respect to the pulse voltage, representing a measure of displacement, is provided in the form of an analog voltage or a digital code.

5 Claims, 35 Drawing Figures

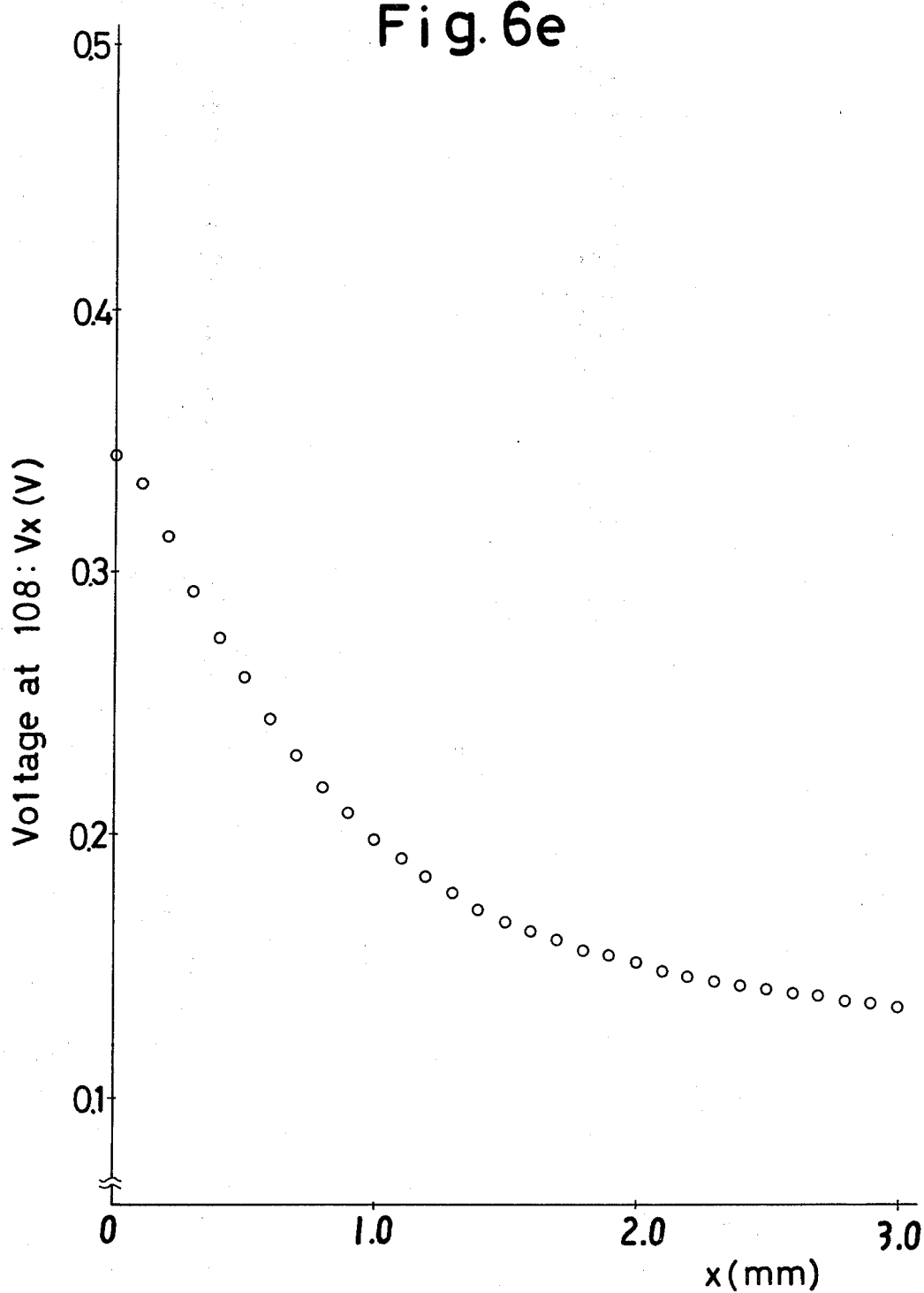

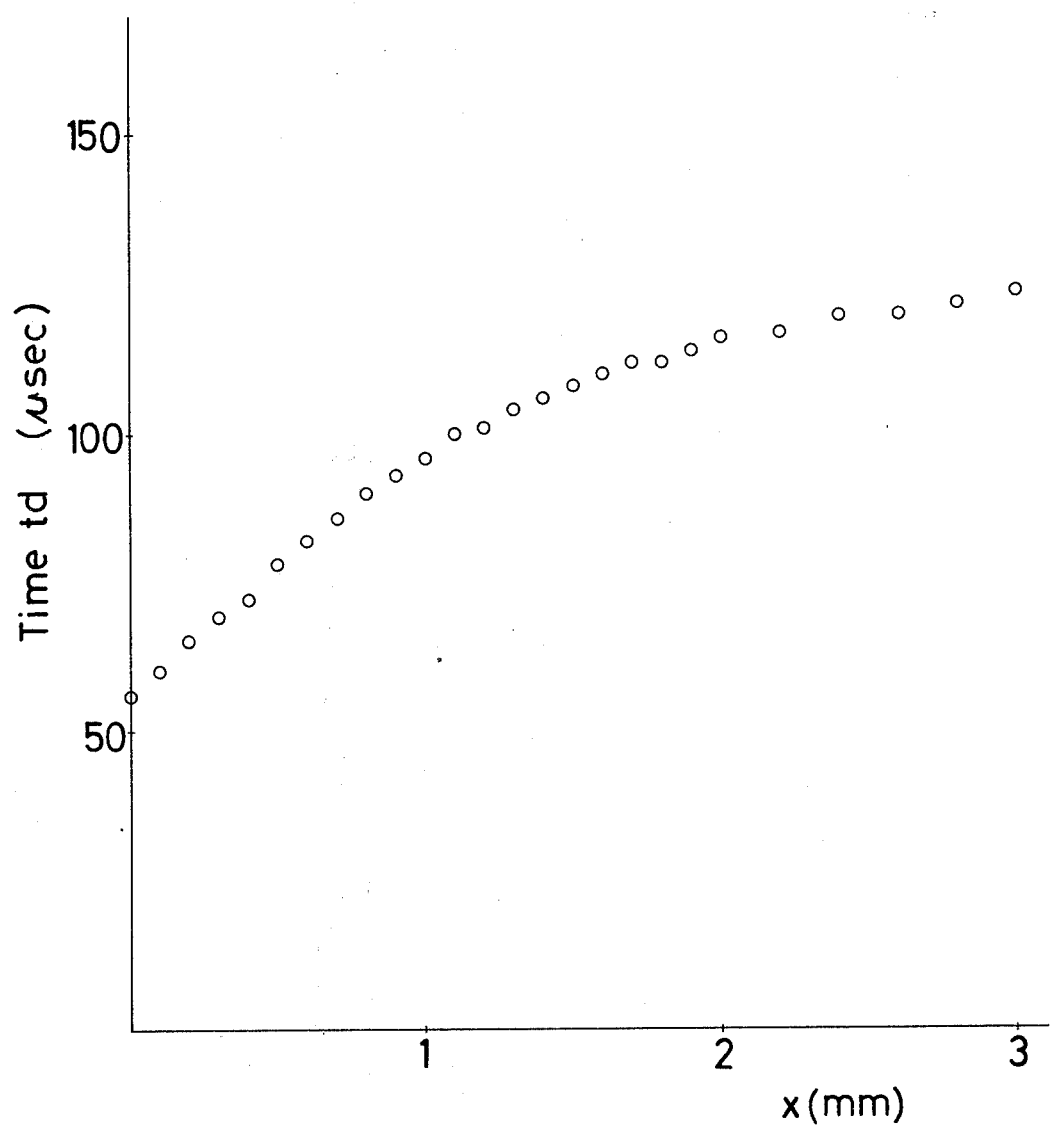

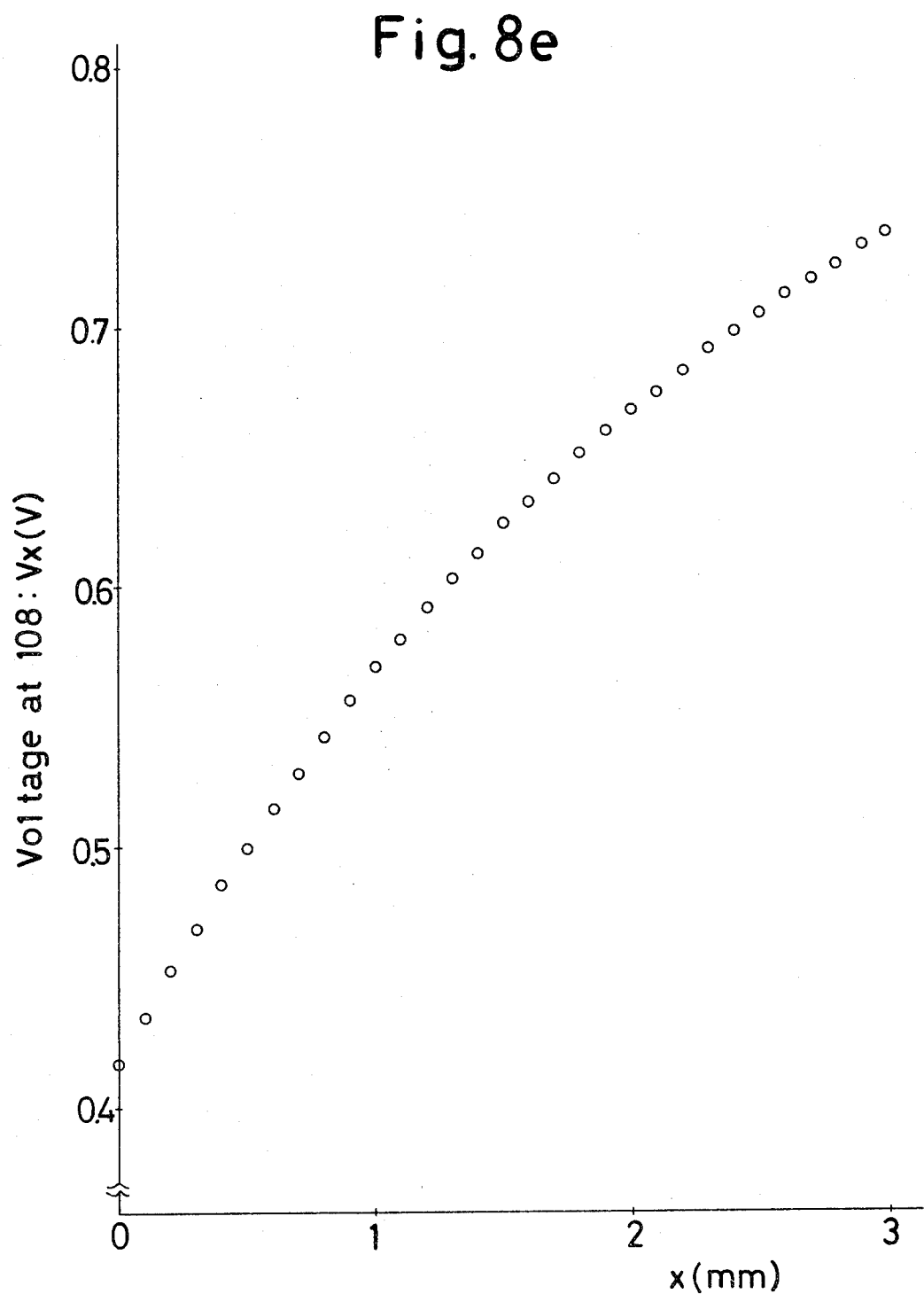

POSITION SENSOR

BACKGROUND OF THE INVENTION

1. Field of the Invention

The present invention relates to a position sensor, and more particularly to a position sensor which converts an operatively displaced position of an operative device into an electrical signal.

2. Description of the Prior Art

One conventional arrangement of this type sensor is provided with a potentiometer having a slider connected with the operatively displaced member of the operative device. In this arrangement, the potentiometer provides an analog voltage corresponding to the operatively displaced position of the operatively displaced member. In this position sensor, it is desirable that a thin film resistor forming the potentiometer exhibits a high abrasion resistance and provides a stabilized reading of an output voltage for a given slider position. It is also desired that the operatively displaced member and the slider be mechanically connected with each other with a reduced amount of rattling and that a stabilized contact is maintained between the slider and the thin film resistor in the presence of oscillations or shocks. However, because the slider in the potentiometer is brought into contact with the thin film resistor under pressure, an abrasion or oscillations may cause production of an unstable output voltage in respect to a displaced position of the operatively displaced member.

SUMMARY OF THE INVENTION

It is therefore an object of this invention to provide a novel position sensor exhibiting a high shock resistance, abrasion resistance, stability and durability in a mechanical-to-electrical conversion system which converts a mechanical displacement into an electrical signal.

Another object of the invention is to provide a novel position sensor which only requires a relatively simple electrical processing of a detection signal for determination of the operative displacement of the operative device.

It is a further object of the invention to provide a novel position sensor capable of providing an operative displacement read-out with relatively simple read-out logic in the form of a large scale integral circuit such as microcomputer.

These and other objects are achieved according to the invention by providing a new and improved position sensor including a movable body moving in response to operation of an operative device, the displaced position of which is to be detected, and a displacement-pulse conversion mechanism including a magnetically soft amorphous metal member in which is produced stress variations in response to the displacement of the movable body, and an electrical coil wound on the magnetically soft amorphous metal member. The electrical coil has a sufficiently increased number of turns so that the magnetically soft amorphous metal member can be magnetically saturated with a relatively low applied voltage or at a relatively low current level.

Upon application of voltage to the coil wound on the magnetically soft amorphous metal member, a time T required from the instant of application of the voltage to the time when a current in the electrical coil reaches a predetermined level can be expressed as follows:

$$T = (N/E)\phi \tag{1}$$

where E represents the voltage applied, N the number of turns in the electrical coil and $\phi$ the amount of variation from a residual magnetic flux density to a saturated magnetic flux density resulting from the magnetic field produced by the predetermined level of coil current. The magnitude of $\phi$ is in direct proportion to the value of permeability of the magnetically soft amorphous metal member. When the magnetically soft amorphous metal member produces a stress, for example a tensile stress, the permeability of the magnetically soft amorphous metal member is increased in dependence on the magnitude of the tensile stress and therefore $\phi$ is correspondingly increased. On the other hand, when a compressive stress is produced, the permeability of the magnetically soft amorphous metal member is decreased in dependence on the magnitude of the compressive stress and therefore $\phi$ is correspondingly decreased. In this manner, the length of time T from the application of a voltage to the coil until the coil current reaches a given level is increased in response to the tensile stress produced in the magnetically soft amorphous metal member or decreased in response to the compressive stress. Accordingly, in the position sensor of the invention, an electrical circuit or a semiconductor electronic device is provided to determine the value of T and provide an electrical signal in the form of a voltage level, digital code or the like indicative of such value.

Since a magnetically soft amorphous metal member must be manufactured by quenching from a liquid phase metal, it is formed as a thin sheet. It magnetically exhibits a ferromagnetism and has a high level of magnetic saturation, high permeability ($\mu_{max} > 10^3$) and a low level of a coercive force ($< 1.0$ Oe) while mechanically exhibiting a very high break strength and an excellent resiliency and stability, and providing a lesser change of property under temperature variations than a semiconductor. Some magnetically soft materials are described in Hasegawa et al, "Soft Magnetic Properties of Metallic Glasses—Recent Developments", J. Appl. Phys. 50(3), Mar. 1979, pp. 1551-1556. Magnetically soft materials are sold under the trademark METGLAS (TM) by Allied Chemical Corp.

Such properties of a magnetically soft amorphous metal member are very preferred for use in the position sensor of the invention. Its use advantageously facilitates signal processing and increases the accuracy in the determination of the value of T. In addition, in mechanical aspects, the manufacturing is simplified while providing a higher durability and a reduced susceptibility to the influence of temperature variations.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2b is a graph which shows the waveforms of input and output signals to or from the electrical processing circuit 100 shown in FIG. 2a;

FIG. 3 is a circuit diagram illustrating another electrical processing circuit 120 connected to the electrical coil 8 of the position sensor for deriving a pulse indicative of a time lag corresponding to the position detected;

FIG. 3b is a graph which illustrates the waveforms of input and output signals of the electrical processing circuit 120 shown in FIG. 3a;

FIG. 6e is a graph which shows data indicative of $V_x$ which varies in accordance with the displacement x utilizing the dimensions and the arrangement illustrated in FIGS. 6a to 6d when the electrical coil 8 is connected to the electrical processing circuit 100 shown in FIG. 2a;

FIG. 6f is a graph which shows data indicative of the time lag $t_d$ which varies in accordance with the displacement x utilizing the dimensions and arrangement illustrated in FIGS. 6a to 6d when the electrical coil 8 is connected to the electrical processing circuit 120 shown in FIG. 3a;

DESCRIPTION OF THE PREFERRED EMBODIMENTS

Figure 1:
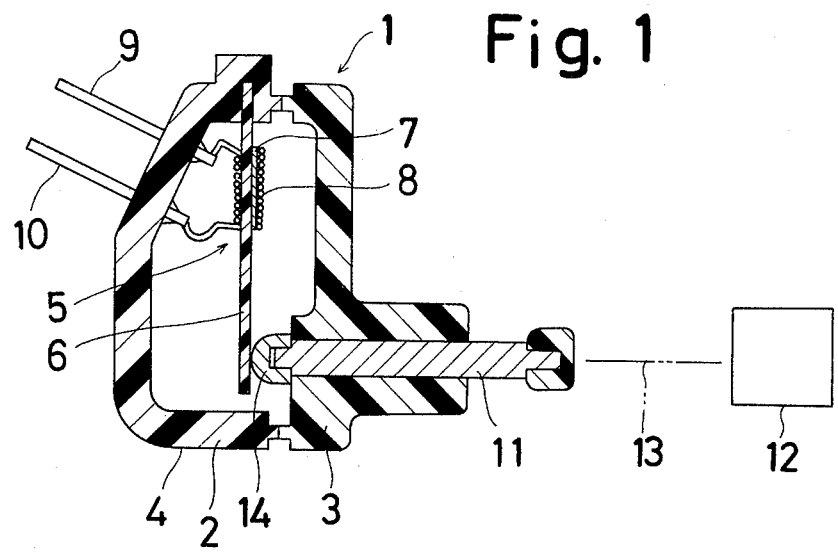
FIG. 1 is a longitudinal cross-sectional view of a position sensor according to a first embodiment of the invention.

Referring now to the drawings, wherein like reference numerals designate identical or corresponding parts throughout the several views, and more particularly to FIGS. 1–6f thereof, a first embodiment of the position sensor according to the invention is described.

First Embodiment, FIG. 1 to FIG. 6f

The position sensor shown in FIG. 1 includes a casing 4 having a body 2 and a body 3 integrally cemented therewith, wherein a core 5 having one end fixed to the body 2 is positioned. The core 5 comprises a plain plate-like elastic member 6 such as epoxy resin, vinyl chloride resin or beryllium copper and a plain plate-like magnetically soft amorphous metal member 7 integrally cemented to the right side thereof. An electrical coil 8 is wound on the magnetically soft amorphous metal member 7 of the core 5.

Reference numerals 9 and 10 designate terminals of the electrical coil 8. A reference numeral 11 designates a movable member which has a right end connected to an operative device 12 through a connecting mechanism 13 and is adapted to move axially through a guide of body 3 in response to displacement of the operative device 12. To the left side of the movable member 11 an engaging member 14 for making engagement with the core 5 is connected which is in engagement with the right side at the other end of the elastic member 6.

In FIG. 1, the position of the movable member 11 is shown when the operative device 12 is located at a non-displaced position. In this condition, the engaging member 14 is positioned only to abut against the elastic member 6 resulting in no deflection of the core 5. Accordingly, no stress is produced in the magnetically soft amorphous metal member. Thus, when the operative device 12 is moved leftwardly toward a displaced position, the movable member 11 is displaced leftwardly in response to the operative device 12, whereby the other end of the core 5 is displaced leftwardly in response to the displacement of the movable member 11 by operation of the engaging member 14, that is, a deflection is produced. As a result, a tensile stress is produced in the magnetically soft amorphous metal member 7 integrally cemented to the elastic member 6 in response to the displacement of the movable member 11, and the tensile stress is increased in dependence on the leftward displacement of the movable member 11. The tensile stress produced in the magnetically soft amorphous metal member 7 is detected by an electrical processing circuit or an electronic logical processing unit.

Figure 2A:
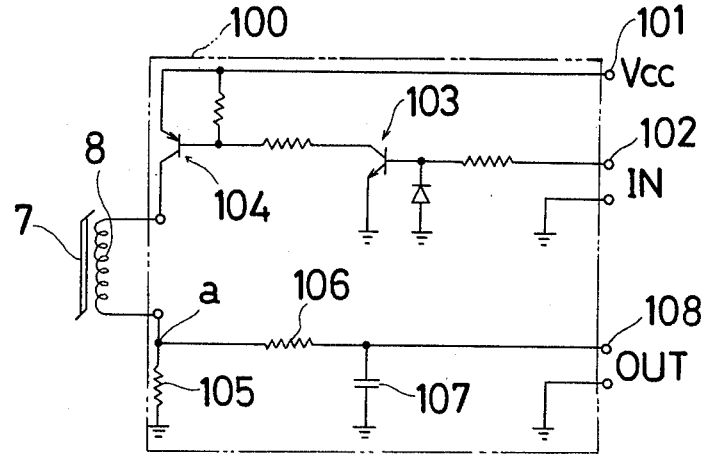
FIG. 2a is a circuit diagram illustrating an electrical processing circuit 100 connected to the electrical coil 8 of the position sensor for producing an analog voltage of a lever which corresponds to the position detected.

FIG. 2a shows one form of electrical processing circuit 100. A constant level of D.C. voltage, Vcc, for example +5 V, is applied to the constant voltage source terminal 101 of the circuit 100. The circuit 100 also includes an input terminal 102, to which a voltage pulse having a frequency on the order of 5–25 KHz, for example, is applied. An NPN transistor 103 is rendered conductive during the time the pulse voltage remains positive and rendered non-conductive when the pulse voltage assumes a ground level. A PNP transistor 104 is turned on and off when the transistor 103 is turned on and off, respectively. Hence, the constant voltage (Vcc) is applied to the electrical coil 8 during the time the voltage pulse applied to the input terminal 102 remains positive, while no voltage is applied thereto during the time the voltage pulse remains at the ground level. A voltage proportional to current flowing through the coil 8 is developed across a resistor 105, and is integrated by an integrator formed by a resistor 106 and a capacitor 107, with the integrated voltage appearing at an output terminal 108.

Figure 2B:
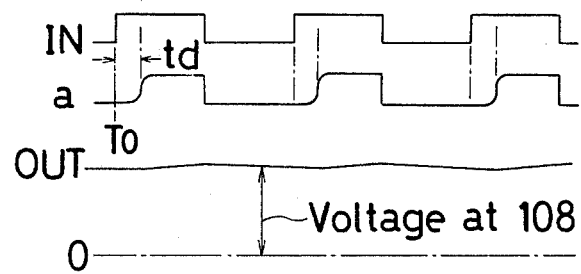

FIG. 2b graphically show the waveforms of the input and output voltages of the circuit shown in FIG. 2a. The time $t_d$ from the rising end of the input voltage (IN) until the voltage across the resistor 105 exceeds a given level, as well as the integrated voltage $V_x$, which represents an integral of the voltage (a) across the resistor 105, both depend on the stress produced in the magnetically soft amorphous metal member 7.

Figure 3A:
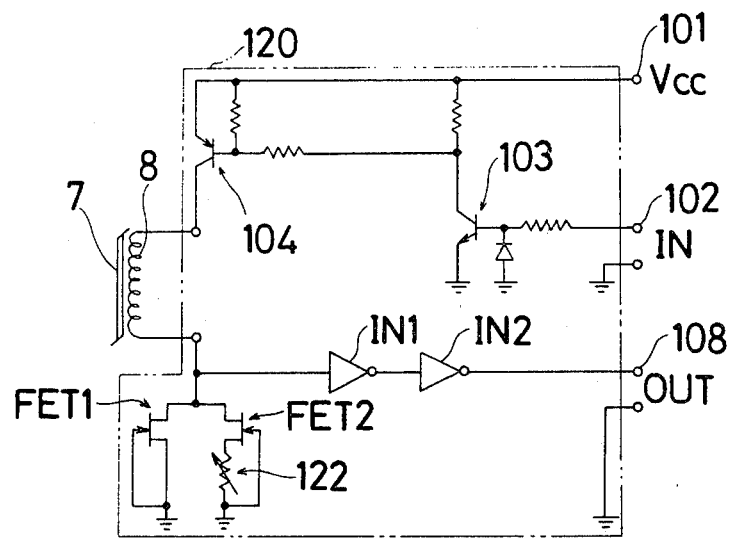

FIG. 3a illustrates another electrical processing circuit 120. In this instance, NPN transistor 103 is turned on and PNP transistor 104 is turned on during the time when the input voltage (IN) remains positive, thus enabling the application of a constant voltage (Vcc) to the coil 8 during the time transistor 103 is on. During the time the input voltage (IN) assumes the ground level, the transistors 103 and 104 are turned off. When transistor 104 is on, a pair of junction N-channel field effect transistors FET1 and FET2 together form a constant current source and maintain a constant current flow through the coil. The current level through FET2 can be adjusted by means of a variable resistor 122. The voltage developed at the terminal of the coil which is connected to FET1 and FET2 is amplified and shaped by a pair of inverting amplifiers IN1 and IN2.

Figure 3B:
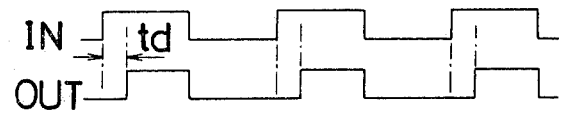
Figure 4:
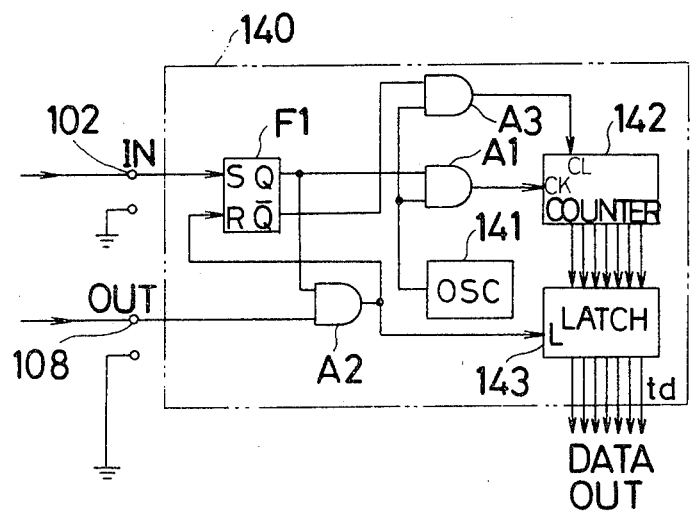
FIG. 4 is a block diagram illustrating a counter circuit 140 which converts a time lag between an input pulse and an output pulse from the electrical processing circuit 120 shown in FIG. 3a into a digital code.

FIG. 3b graphically shows the waveforms of input and output voltages of the circuit of FIG. 3a. The circuit 102 produces an outut (OUT) which is a voltage pulse which is delayed by a time lag $t_d$ with respect to an input pulse (IN), and the magnitude of time lag $t_d$ depends on the stress produced in the magnetically soft amorphous metal member. The magnitude of time lag $t_d$ is represented in the form of digital code by a counter 140 shown in FIG. 4. In the circuit 140, the rising edge of an input voltage (IN) sets a flip-flop F1, whereby its Q output changes to a high level "1" which enables an AND gate A1 to pass a pulse produced by a clock pulse oscillator 141 to a count pulse input terminal CK of a counter 142. An output pulse (OUT) and the Q output of the flip-flop F1 are applied to an AND gate A2, which produces a high level "1" when the output pulse (OUT) rises to a high level. At this point in time, the flip-flop F1 is reset, with its Q output reverting to a low level "0". This disables the AND gate A1, and hence the supply of clock pulses to the counter 142 is interrupted. At the time when the AND gate A2 produces a "1" output, a code indicative of the count in the counter 142 is stored in a latch 143. After the flip-flop F1 is reset and the latch 143 has been loaded with the count code, and AND gate A3 passes a clock pulse to clear the counter 142. An output code from the latch 143 indicates the number of clock pulses passed during the time interval of $t_d$, and hence represents the magnitude $t_d$.

Figure 5:
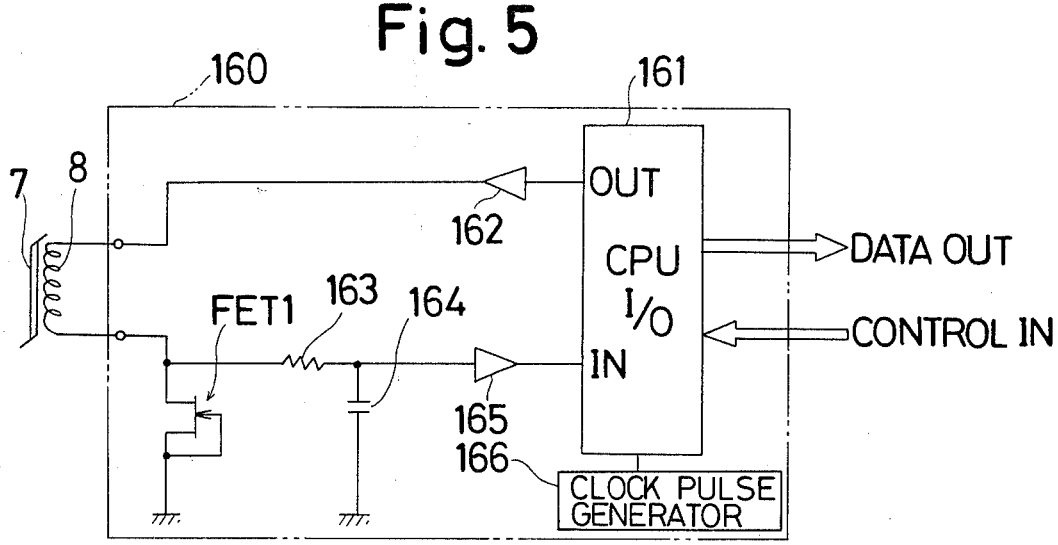
FIG. 5 is a block diagram illustrating an electronic processing unit 160 connected to the electrical coil of the position sensor for determining a time lag of the rising edge of a current pulse flowing through the electrical coil 8 of the position sensor in response to a pulse voltage applied thereto from a single chip microcomputer.
Figure 6A:
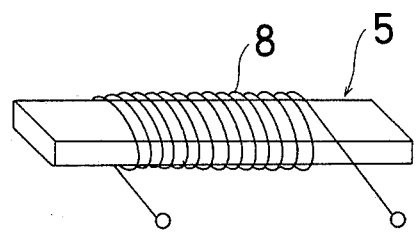
FIG. 6a is a perspective view of a core 5 under the condition of which an indicated voltage $V_x$ and a time lag of the pulse $t_d$ corresponding to the displacement of one end of the core 5 are experimentally determined.

An electronic processing unit 160 shown in FIG. 5 comprises a single chip microcomputer (a large scale integrated semiconductor unit) 161, an amplifier 162, a junction N-channel field effect transistor FET1 which acts as a constant current control, resistor 163 capacitor 164, an amplifier 165 and a clock pulse oscillator 166. The combination of the resistor 163 and the capacitor 164 forms a filter which absorbs voltage oscillations of higher frequencies than the frequency of the input and the output pulses. The microcomputer 161 forms pulses of a given frequency in a range from 5 to 30 KHz in response to input clock pulses, and feeds it to the amplifier 162. On the other hand, the microcomputer 161 monitors the voltage developed at the junction between the N-channel FET1 and one end of the coil 8, or the output voltage of the amplifier 165, and counts the clock pulses which are developed during the time $t_d$ from the rising edge of the pulse outputted by itself until the output voltage of the amplifier 165 rises to a given level, whereby the microcomputer forms an output code indicative of the value of $t_d$ (DATA OUT).

As discussed above, the position sensor shown in FIG. 1 may be connected to a variety of electrical processing circuits or an electronic logical processing unit to provide an electrical signal indicative of the stress produced in the magnetically soft amorphous metal member 7 of the position sensor 1. The use of the position sensor 1 shown in FIG. 1 in combination with the electrical processing circuits 100, 120 and 140 or the logical processing unit 160 to derive an electrical signal corresponding to the position detected will now be described.

Initially, the movable member 11 of the position sensor 1 converts the operatively displaced position of the operative device 12 into the stress produced in the magnetically soft amorphous metal member 7. The conversion of the tensile stress produced in the magnetically soft amorphous metal member 7 into an electrical signal will now be described with reference to experimental data shown in FIGS. 6e to 6f. As shown in FIGS. 6a to 6d, two of the magnetically soft amorphous metal members 7 are integrally cemented with each other by epoxy adhesives. Further, two sets of the magnetically soft amorphous metal members cemented are integrally cemented in parallel with each other on a substrate 6 of epoxy resin to form a core 5. The core 5 was fixed at its left end to the vise 81 with the magnetically soft amorphous metal members 7 kept on the upper side thereof. A dial gauge (not shown) was set at the position which is spaced 5 mm away from the right end of the core 5. Then, the values of $V_x$ and $t_d$ were determined with respect to deflection x of the core 5 in the direction X. The specific values of various dimensions a–e in the configurations, and the material of the magnetically soft amorphous metal member as well as data obtained are indicated in the Table 1 below as listed in Cases No. 1 and 2.

stress is produced in the magnetically soft amorphous metal member 7, and the compressive stress is increasingly changed in dependence on the leftward displacement of the movable member 11. The use of the position sensor 1 shown in FIG. 1 in combination with the electrical processing circuit 100, 120 and 140 or the logical processing unit 160 to derive an electrical signal corresponding to the position detected will now be described. Initially, the movable member 11 of the position sensor 1 converts the position detected into the compressive stress in the magnetically soft amorphous metal member 7. The conversion of the compressive stress in the magnetically soft amorphous metal member 7 into an electrical signal will now be described with reference to experimental data shown in FIGS. 8e–8f. As shown in FIGS. 8a to 8d, two of the magnetically soft amorphous metal members 7 are integrally cemented with each other by epoxy adhesives. Further, two sets of the magnetically soft amorphous metal members cemented are integrally cemented in parallel with each other on a substrate 6 of epoxy resin to form a core 5. The core 5 has been fixed at its left end of the vise 81 with the magnetically soft amorphous metal members 7 kept on the upper side thereof. A dial gauge (not shown) is set at the position which is spaced 5 mm away from the right end of the core 5. Then the values of $V_x$ and $t_d$ have been determined with respect to deflection x of the core 5 in the direction X. The specific values of various dimensions a–e in the configurations, and the material of the magnetically soft amorphous metal member as well as data obtained are indicated in the Table 1 above as listed in Cases No. 3 and 4.

In case No. 3, it is seen from data shown in FIG. 8e

TABLE

| Case No. | Magnetically Soft Amorphous Metal Member | | | | | Elastic Member | | | Coil 8 | Measuring means and frequency of input pulse | Data |
|---|---|---|---|---|---|---|---|---|---|---|---|
| | Material, At. Weight Percent | Thickness mm. | a mm | b mm | Number of Sheets | c mm | d mm | e mm | Number of turns | | |
| 1 | Fe40Ni40P14B6 | 0.058 | 80 | 1.8 | 4 | 95 | 6 | 0.6 | 2000 | circuit 100 5 K Hz | FIG. 6e |
| 2 | " | " | " | " | " | " | " | " | " | circuit 120 & syncroscope 100 Hz | FIG. 6F |
| 3 | " | " | " | " | " | " | " | " | " | circuit 100 | FIG. 8e |
| 4 | " | " | " | " | " | " | " | " | " | 5 K Hz circuit 120 & syncroscope 100 Hz | FIG. 8f |

In Case No. 1, it is seen from data shown in FIG. 6e that a voltage $V_x$ of a high accuracy can be obtained for the deflection x from 0 to 1.8 mm. In Case No. 2, it is seen from data shown in FIG. 6f that a time lag $t_d$ of a good linearity and high variation is obtained for the deflection x from 0 to 0.9 mm and from 1.0 to 1.8 mm.

Figure 7:
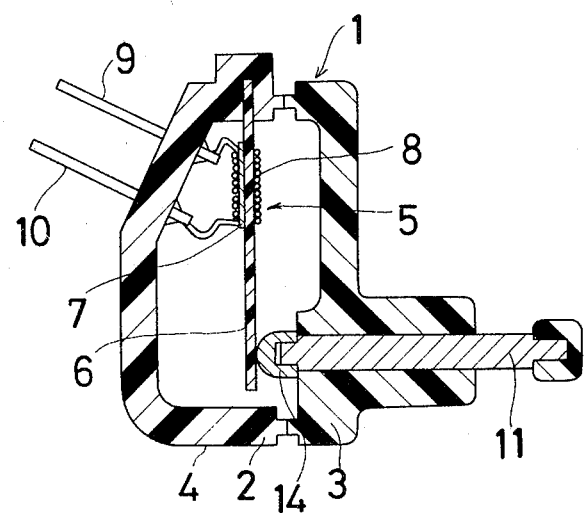
FIG. 7 is a longitudinal cross-sectional view of a position sensor according to a second embodiment of the invention.
Figure 6B:
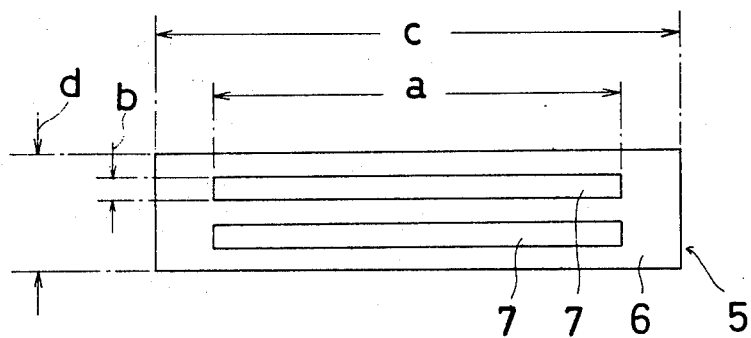
FIG. 6b is a plan view of the core 5 shown in FIG. 6b with the electrical coil 8 not shown for clarity.
Figure 6C:
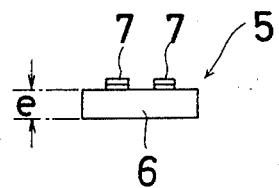
FIG. 6c is a right side view of the core 5 shown in FIG. 6b.
Figure 6D:
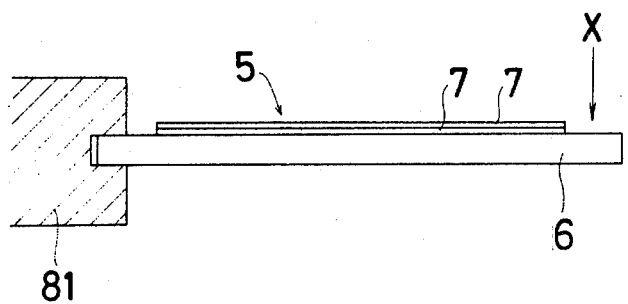
FIG. 6d is a schematic front view illustrating an experimental arrangement wherein the right end of the core 5 shown in FIGS. 6a to 6c is displaced so that a tensile stress is produced in the magnetically soft amorphous metal member 7, with the electrical coil 8 not shown for clarity.
Figure 8A:
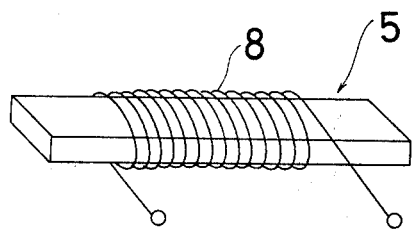
FIG. 8a is a perspective view of a core 5 which is experimentally used in determining an indicated voltage $V_x$ and a time difference corresponding to the displacement of one end of the core 5.
Figure 8B:
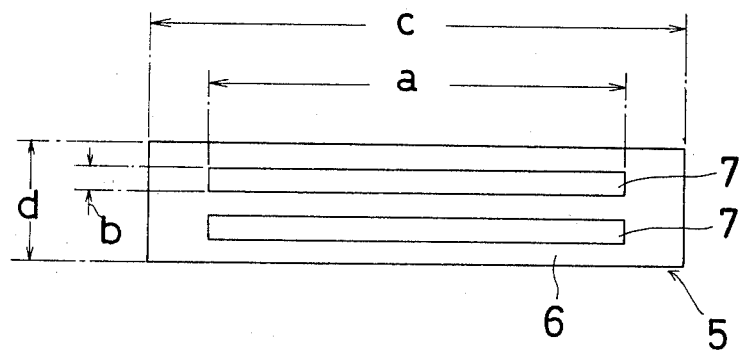
FIG. 8b is a plan view of the core 5 shown in FIG. 8a with the electrical coil 8 not shown for clarity.
Figure 8C:
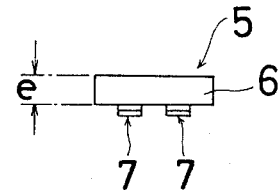
FIG. 8d is a schematic front view illustrating an arrangement which is experimentally used in producing a compressive stress in the magnetically soft amorphous metal member 7 through the displacement of the right end of the core shown in FIGS. 8a to 8c, with the electrical coil 8 not shown for clarity.
FIG. 8e is a graph which shows data of voltage $V_x$ measured relative to displacement x when the electrical coil 8 is connected to the electrical processing circuit 100 shown in FIG. 2a with the dimensions and arrangement shown in FIGS. 8a to 8d.
FIG. 8f is a graph which shows data of the time difference $t_d$ measured relative to a displacement x when the electrical coil 8 is connected to the electrical processing circuit 120 shown in FIG. 3a, with the dimensions and the arrangement shown in FIGS. 8a to 8d.
Figure 8D:
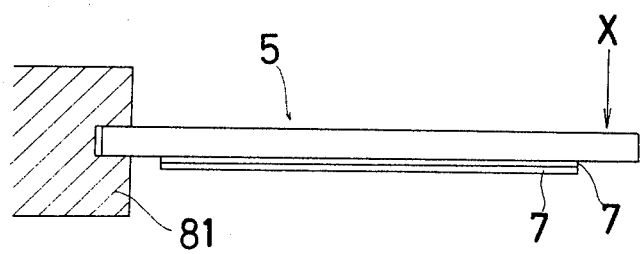
Figure 8F:
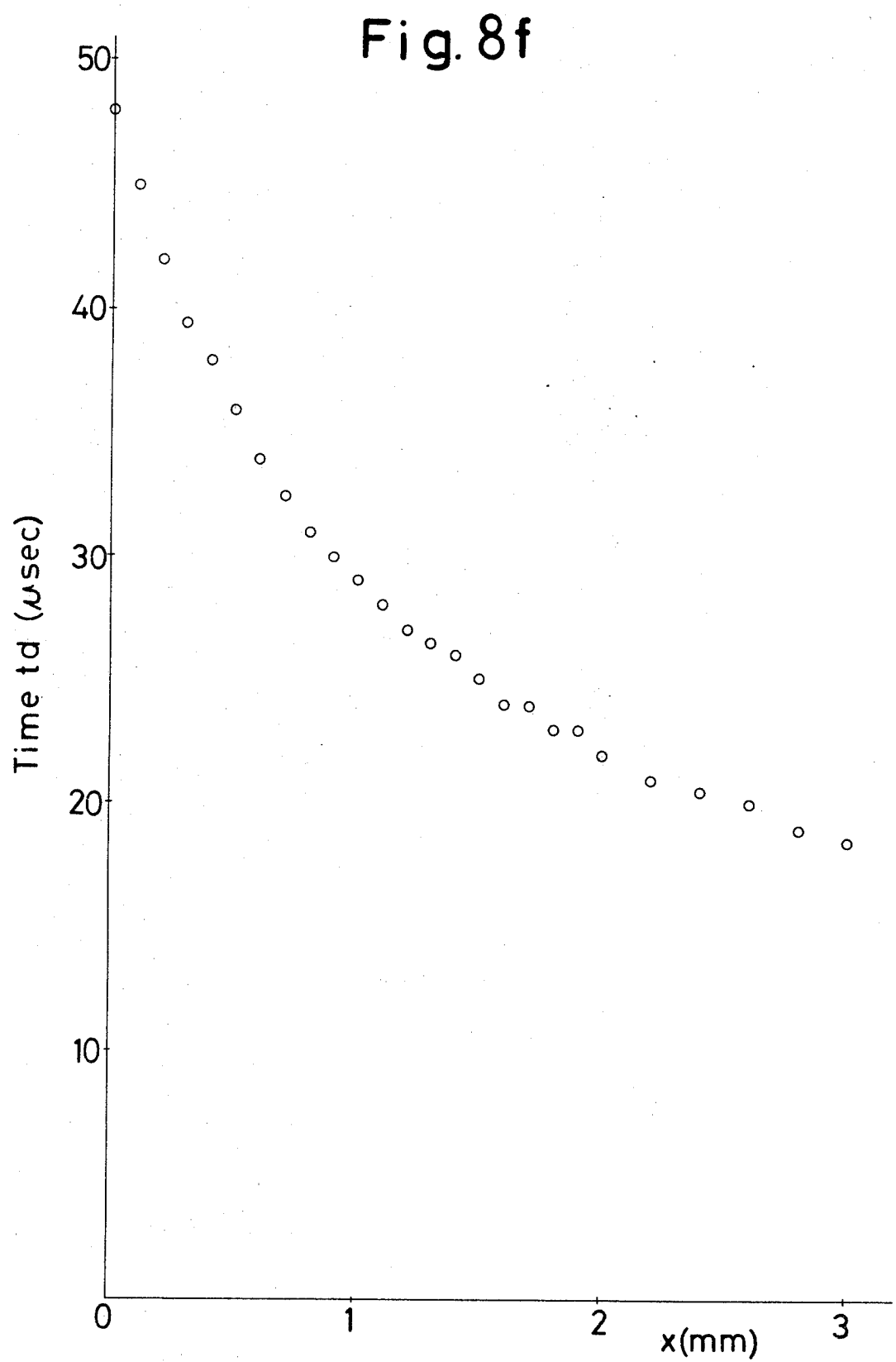

Second Embodiment, FIG. 7 to FIG. 8f

A position sensor shown in FIG. 7 is different from the position sensor shown in FIG. 1 in that the magnetically soft amorphous metal member 7 is integrally cemented on the left side of the elastic member 6 to form the core 5 in the latter. In this arrangement, when the movable member 11 is displaced leftwardly, the lower end of the core 5 in engagement with the engaging member 14 is leftwardly displaced in response to the displacement of the movable member 11, that is, a deflection is produced. Accordingly, in response to the displacement of the movable member 11, a compressive that a voltage $V_x$ of a high accuracy can be obtained for the deflection from 0–3 mm. In case No. 4, it is seen from data shown in FIG. 8f that a time lag $t_d$ of a good linearity and high variation is obtained for the deflection from 0 to 0.8 mm and from 0.9 to 2 mm.

Figure 9:
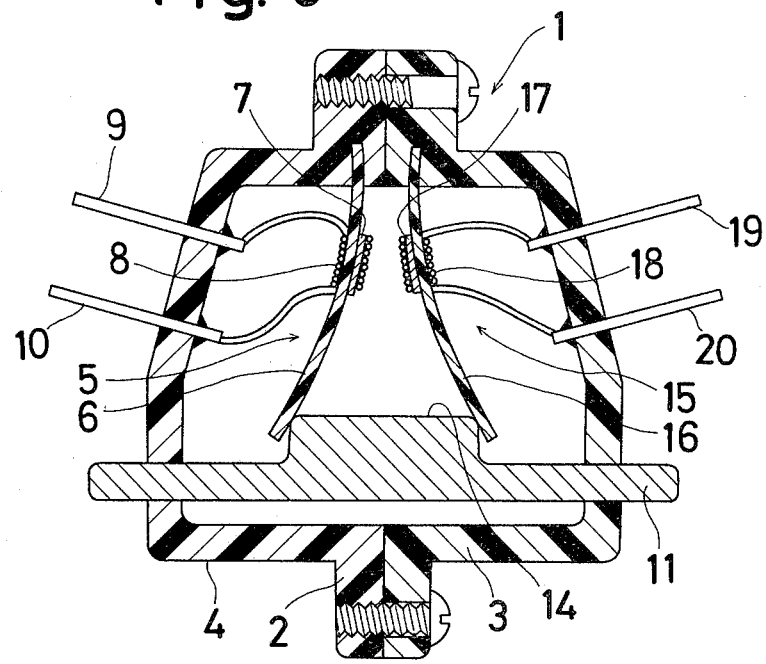
FIG. 9 is a longitudinal cross-sectional view of a position sensor according to a third embodiment of the invention.
Figure 10A:
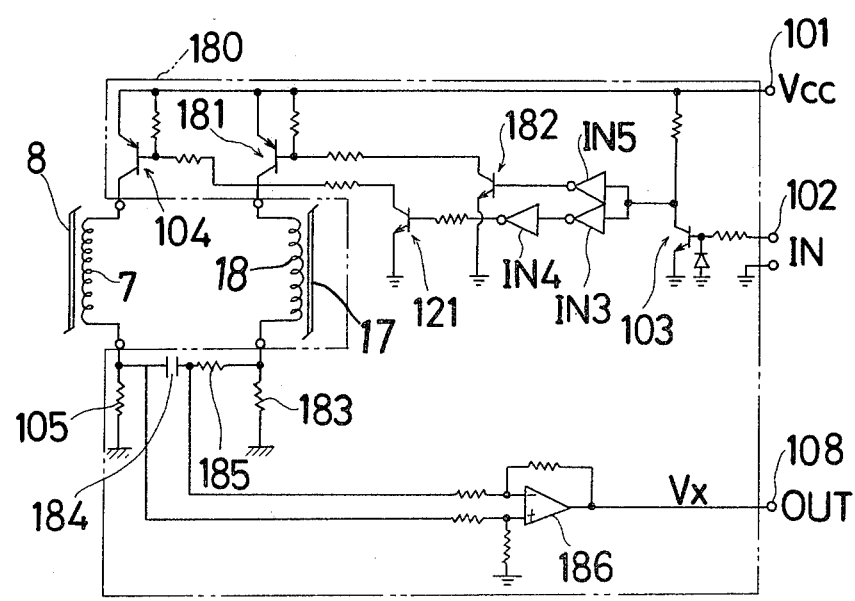
FIG. 10a is a circuit diagram of an electrically processing circuit 180 connected to the electrical coils 8 and 18 of the position sensor shown in FIG. 9 for producing an analog voltage of a level which corresponds to the position detected.
Figure 10B:
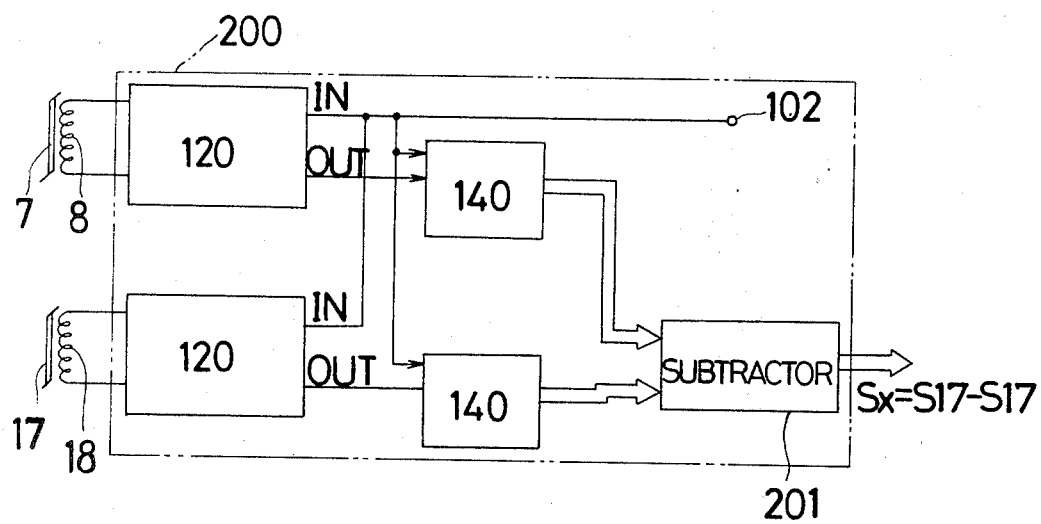
FIG. 10b is a block diagram of an electrical processing circuit connected to the electrical coils 8 and 18 of the position sensor shown in FIG. 9 for producing a digital code which corresponds to the position detected.
Figure 10C:
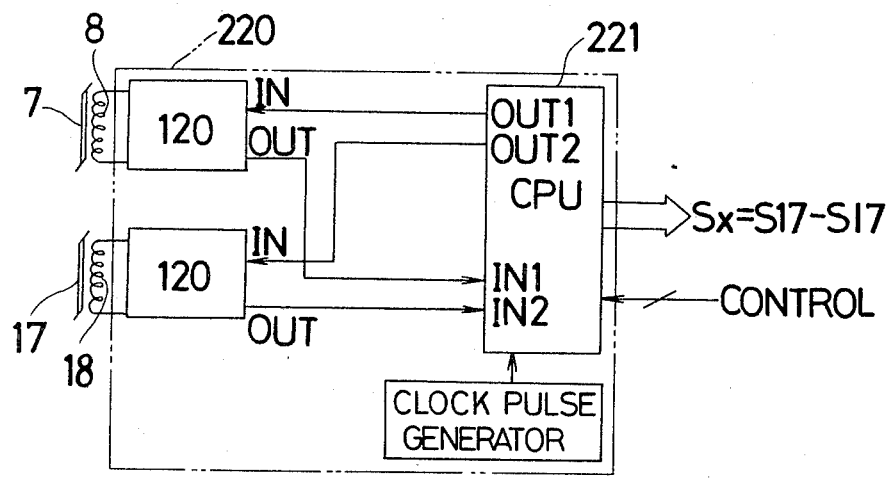
FIG. 10c is a block diagram of an electronic logical processing unit 220 connected to the electrical coils 8 and 18 of the position sensor shown in FIG. 9 for producing a digital code which corresponds to the position detected.

Third Embodiment, FIG. 9 to FIG. 10c

In the position sensor 1 shown in FIG. 9, in addition to the core 5 similar to the position sensor shown in FIG. 1 there is provided another core 15. The magnetically soft amorphous metal member 7 is integrally cemented on the left side of the elastic member 6 formed of an epoxy resin, vinyl chloride resin or beryllium copper, etc., and has a flat configuration in a free condition, to form the core 15. An electrical coil 18 is wound on the magnetically soft amorphous metal member 7 of the core 15. Reference numerals 19 and 20 designate terminals of the electrical coil 18. The core 15 includes an elastic member 16 fixed at its one end of the body 3 as well as the core 5. An engaging member 14 integrally formed with a movable member 11 is positioned between the other ends of the cores 5 and 15 to cause a deflection at the other ends of the cores 5, 15. As shown in FIG. 9, an initial compressive stress is produced in each of magnetically soft amorphous metal members 7, 17 cemented integrally with the elastic members 6 and 16 at the intermediate displaced position of the movable member 11. When the movable member 11 is leftwardly displaced from the position shown in FIG. 9, the deflection in the core 5 is increased and the core 15 is returned to its flat condition. Accordingly, a tensile stress produced in the magnetically soft amorphous metal member 7 of the core 5 is increased beyond the initial tensile stress in response to the leftward displacement of the movable member 11, and another tensile stress produced in the magnetically soft amorphous metal member 17 of the core 5 is decreased in response to the leftward displacement of the movable member 11. On the contrary, when the movable member 11 is rightwardly displaced from the position shown in FIG. 9, a tensile stress produced in the magnetically soft amorphous metal member 7 is decreased and another tensile stress produced in the magnetically soft amorphous metal member 17 is increased. The use of the position sensor 1 shown in FIG. 9 in combination with an electrical processing circuit 180, 200 or a logical processing unit 220 shown in FIGS. 10a, 10b and 10c provides an electrical signal corresponding to the position detected.

The electrical processing circuit 180 shown in FIG. 10a provides an analog voltage $V_x$ corresponding to the displacement of the movable member 11 of the position sensor 1 shown in FIG. 9. In the circuit 180, NPN transistor 103 is turned on during the time the pulse voltage remains positive and turned off when the pulse voltage assumes a ground level. The collector voltage of the transistor 103 is amplified and shaped through a pair of inverting amplifiers IN3 and IN4, and is thereafter applied to the base of NPN transistor 121. As a result, during the time the input voltage pulse (IN) remains positive, the transistors 103 and 121 are turned on and off, respectively, while the PNP transistor 104 is turned off. During the time the input voltage pulse (IN) assumes the grund level, the transistors 103 and 121 are turned off and on, respectively, while the transistor 104 is turned on. Accordingly, a pulse voltage is applied to the coil 8 by the function similar to that of the circuit 120 in FIG. 3a, whereby a voltage pulse is developed across a resistor 105, said voltage pulse rising with time lag $t_d$ from the falling edge of the input voltage pulse (IN) corresponding to the stress produced in the magnetically soft amorphous metal member.

A constant voltage is applied to another electrical coil 18 through a PNP transistor 181. During the time the input voltage pulse (IN) remains positive, transistor 103 is turned on, the output of the inverting amplifier IN5 is at a positive level and a NPN transistor 182 is turned on, and therefore the transistor 181 is turned on. Transistor 181, on the other hand, is turned off during the time the input voltage pulse (IN) assumes the ground level. As a result, the constant voltage (Vcc) is applied to the second electrical coil 18 when the voltage (Vcc) is not applied to the first electrical coil 8, and is not applied to the second electrical coil 8 when the voltage (Vcc) is applied to the first electrical coil 8. That is, the constant voltage is alternately applied to the first and second coils 8 and 18 in response to the input voltage pulse (IN). A resistor 183 is connected to the second electrical coil 18. A voltage pulse is developed across the resistor which is rising with time lag $td_2$ from the rising edge of the input voltage pulse (IN) and corresponds to the stress produced in the magnetically soft amorphous metal member. The voltage $Vx_1$ across the resistor 105 is applied to one of electrodes of capacitor 184 and the voltage $Vx_2$ across the resistor 183 is applied to the other electrode of the capacitor 184. The stress produced in the magnetically soft amorphous metal members 7 and 17 are represented by $x_1$ and $x_2$ respectively, with $x_1+x_2=K$ (constant), and $Vx_1$ and $Vx_2$ are proportional to $x_1$ and $x_2$, respectively, and therefore the potential difference across the capacitor 184 corresponds to the magnitude of $(x_1-x_2)$. The capacitor 184 forms an integrator together with a resistor 185, thus producing a voltage thereacross which corresponds to the magnitude of $(x_1-x_2)$. Since $x_2=K-x_2$, $x_1-x_2=2x_1+K$. Thus, the voltage across the capacitor 184 corresponds to the magnitude of $2x_1$. That is, an analog voltage is obtained which corresponds to twice the stress $x_1$ produced in magnetically soft amorphous metal member 7 as referenced to the magnetically soft amorphous metal member 7 of the core 5. The opposite ends of the capacitor 184 are connected to an operational amplifier 186 which is designed as a differential amplifier. The amplifier 186 produces an analog output Vx which corresponds to $2x_1$.

FIG. 10b shows another electrical processing circuit 200 which provides a pair of pulses which lag behind the rising edge of the input pulse by time intervals of $t_{d1}$ and $t_{d2}$, respectively, in a pair of circuits 120. These pulses are applied to a pair of counter circuits 140, respectively, where they are converted into a pair of codes S7 and S17 which represent the magnitude of $t_{d1}-t_{d2}$. These codes are applied to a subtractor 201, which calculates $t_{d1}-t_{d2}$ utilizing the codes S7−S17 which represents $t_{d1}-t_{d2}$ or $2x_1$.

FIG. 10c illustrates an electronic logical processing unit 220 including a single chip microcomputer 221 which applies a single pulse to the circuit 120 connected to the electrical coil 8 while initiating a time counting operation from the rising edge thereof to obtain $t_{d1}$ count data S18, which is retained. Subsequently, the microcomputer applies a single pulse to the circuit 120 connected to the electrical coil 18 while initiating a time counting operation from the rising edge thereof to obtain $t_{d2}$ count data s17. Then it calculates a difference $(t_{d1}-t_{d2})$ to produce a corresponding output code $S_x=S7-S17$. During the time a measurement command signal is present, the microcomputer continues such operation.

Figure 11:
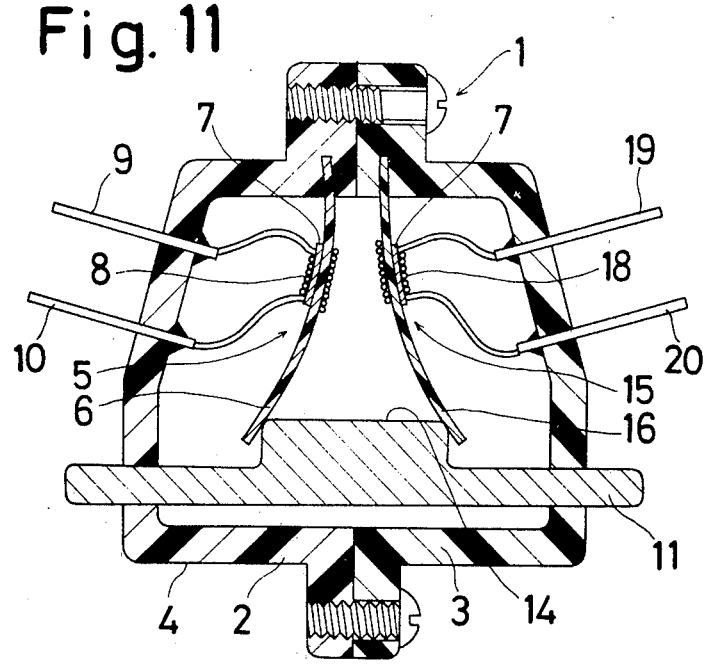
FIG. 11 is a longitudinal cross-sectional view of a position sensor according to a fourth embodiment of the invention.

Fourth Embodiment, FIG. 11

A position sensor shown in FIG. 11 is different from the position sensor 1 shown in FIG. 9 in that magnetically soft amorphous metal members 7 and 17 are integrally cemented to the left side of the elastic member 6 and the right side of the elastic member 16, respectively, to form cores 5 and 15 in the former. In this arrangement as shown in FIG. 9, a same initial compressive stress is produced in each of the magnetically soft amorphous metal members 7, 17 cemented integrally with the elastic members 6 and 16 at the intermediate displaced position of the movable member 11. When the movable member 11 is leftwardly displaced from the position shown in FIG. 9, the deflection in the core 5 is increased and the core 15 is returned to its flat condition. Accordingly, a compressive stress produced in the magnetically soft amorphous metal member 7 of the core 5 is increased beyond the initial compressive stress in response to the leftward displacement of the movable member 11, and another compressive stress produced in the magnetically soft amorphous metal member 7 of the core 5 is decreased from the initial compressive stress in response to the leftward displacement of the movable member 11. On the contrary, when the movable member 11 is rightwardly displaced from the position shown in FIG. 11, a compressive stress produced in the magnetically soft amorphous metal member 7 is decreased and another compressive stress produced in the magnetically soft amorphous metal member 17 is increased. The use of the position sensor 1 shown in FIG. 11 in combination with the electrical processing circuit 180, 200 and a logical processing unit 220 shown in FIGS. 10a, 10b and 10c provides an electrical signal corresponding to the displaced position of the movable member 11.

Figure 12:
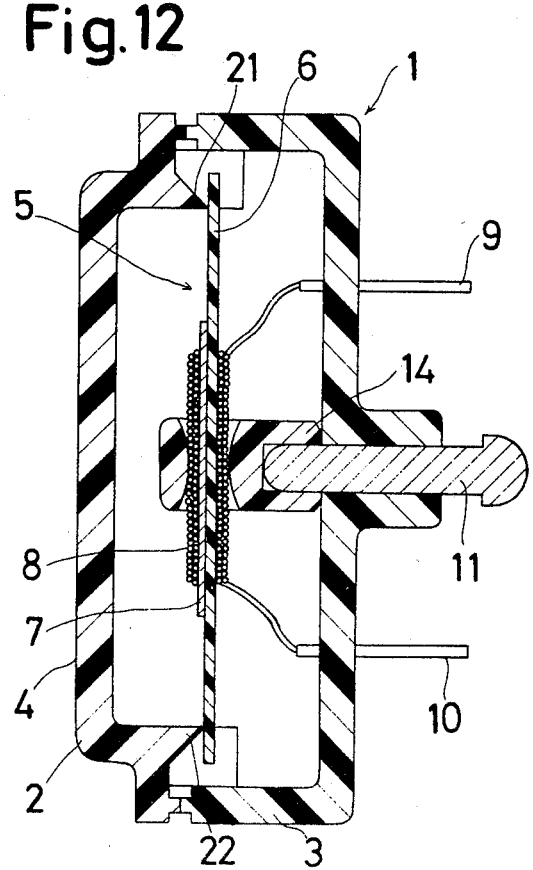
FIG. 12 is a longitudinal cross-sectional view of a position sensor according to a fifth embodiment of the invention.

Fifth Embodiment, FIG. 12

In the position sensor shown in FIG. 12, the opposed ends of the core 5 are retained at the left sides by knife edged retaining portions 21 and 22 formed in the body 2. Core 5 is engaged at its intermediate portion by an engaging member 14. A coil 8 is wound on the magnetically soft amorphous metal member 7 of the core 5. When the movable member 11 is positioned as shown in FIG. 12, the engaging member 14 does not cause the core 5 to produce any deflection and therefore the core 5 is flat, with no stress produced in the magnetically soft amorphous metal member 7.

When the movable member 11 is displaced leftwardly, the intermediate portion of the core 5 is leftwardly deflected by the engaging member 14, whereby a compressive stress is produced in the magnetically soft amorphous metal member 7 cemented integrally with the elastic body 6 in response to the leftward displacement of the movable member 11. The use of the position sensor 1 in combination with the electrical processing circuits 100, 120 and 140 or the logical processing unit 160 provides an electrical signal corresponding to the displaced position of the movable member 11.

Figure 13:
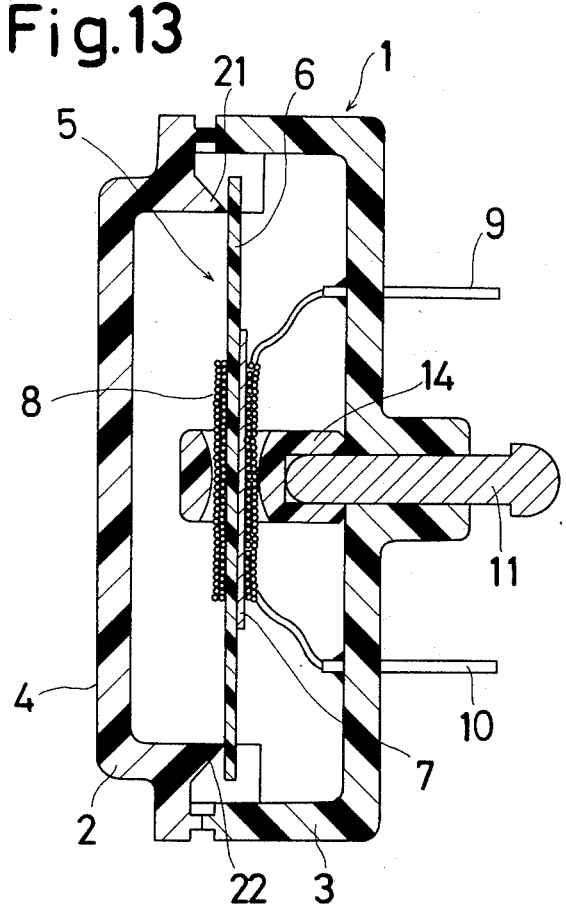
FIG. 13 is a longitudinal cross-sectional view of a position sensor according to a sixth embodiment of the invention.

Sixth Embodiment, FIG. 13

The position sensor 1 shown in FIG. 13 is different from the position sensor 1 shown in FIG. 12 in that the magnetically soft amorphous metal member 7 is formed on the right side of the elastic member 6 integrally therewith to form the core 5. In this arrangement, when the movable member 11 is leftwardly displaced, the intermediate portion of the core 5 is leftwardly deflectd by the engaging member 14, whereby a compressive stress is produced in the magnetically soft amorphous metal member 7 cemented integrally with the elastic member 6 in response to the leftward displacement of the movable member 11. The use of the position sensor 1 shown in FIG. 13 in combination with the electrical processing circuit 100, 120 and 140 or the logical processing unit 160 provides an electrical signal corresponding to the displaced position of the movable member 11.

Figure 14:
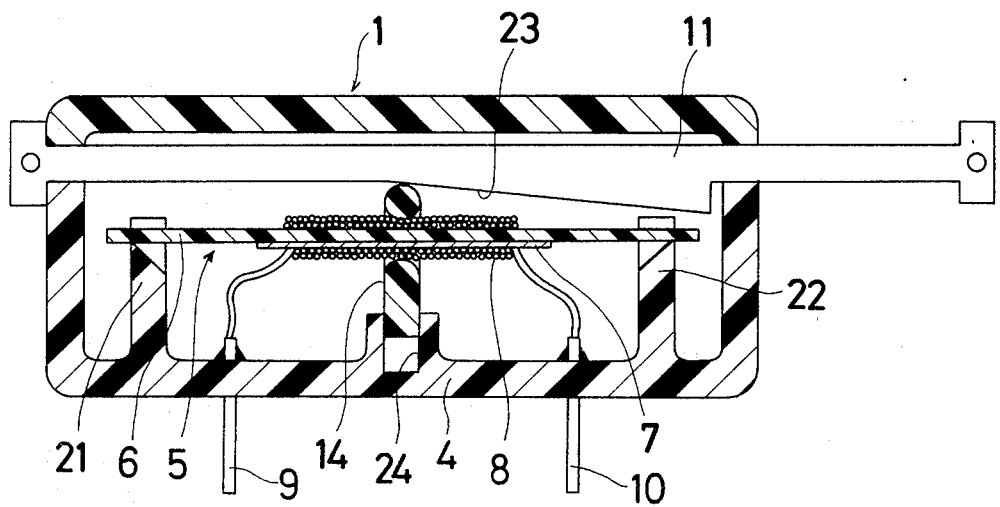
FIG. 14 is a longitudinal cross-sectional view of a position sensor according to a seventh embodiment of the invention.

Seventh Embodiment, FIG. 14

In the position sensor 1 shown in FIG. 14, knife edge-like retaining portions 21 and 22 which are formed integrally with a casing 4 retain the opposed ends of the core 5. The magnetically soft amorphous metal member is formed on the lower side of the elastic body 6 integrally therewith. A coil 8 is wound on the magnetically soft amorphous metal member 7 of the core 5. A cam surface 23 is formed on the lower side of the movable member 11. An engaging member 14 for engagement with the intermediate portion of the core 5 is in engagement therewith. The engaging member 14 is guided movably up and down by the guide portion 24 formed in the casing 4. When the movable member 11 is leftwardly displaced from the position shown in FIG. 14, the engaging member 14 is downwardly displaced by the cam surface 23 in response to the displacement, whereby the intermediate portion of the core 5 is deflected downwardly. Accordingly, a tensile stress which is produced in the magnetically soft amorphous metal member 7 formed integrally with the elastic member 6 is increased in response to the leftward displacement of the movable member 11. The use of the position sensor 1 in combination with the electrical processing circuits 100, 120 and 140 or the logical processing unit 160 provides an electrical signal corresponding to the displaced position of the movable member 11.

Figure 15:
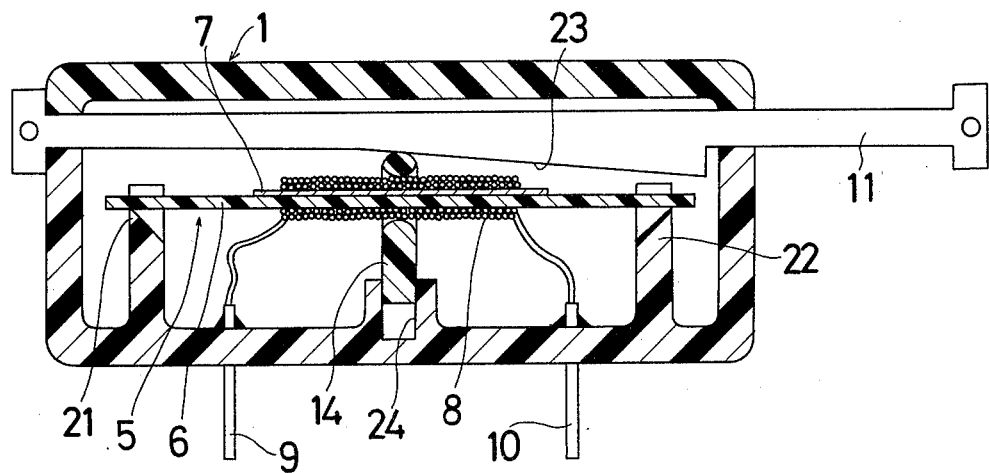
FIG. 15 is a longitudinal cross-sectional view of a position sensor according to an eighth embodiment of the invention.

Eighth Embodiment, FIG. 15

A position sensor 1 shown in FIG. 15 is different from the position sensor shown in FIG. 14 in that the magnetically soft amorphous metal member 7 is cemented on the upper side of the elastic member 6 integrally therewith to thereby form a core 5. In this arrangement, when the movable member 11 is leftwardly displaced from the position shown in FIG. 15, the engaging member 14 is downwardly displaced by the cam surface 23 in response to the displacement, whereby the intermediate portion of the core 5 is deflected downwardly. Accordingly, compressive stress which is produced in the magnetically soft amorphous metal member 7 cemented integrally with the elastic member 6 is increased in response to the leftward displacement of the movable member 11. The use of the position sensor 1 in combination with the electrical processing circuits 100, 120 and 140 or the logical processing unit 160 provides an electrical signal corresponding to the displaced position of the movable member 11.

Figure 16:
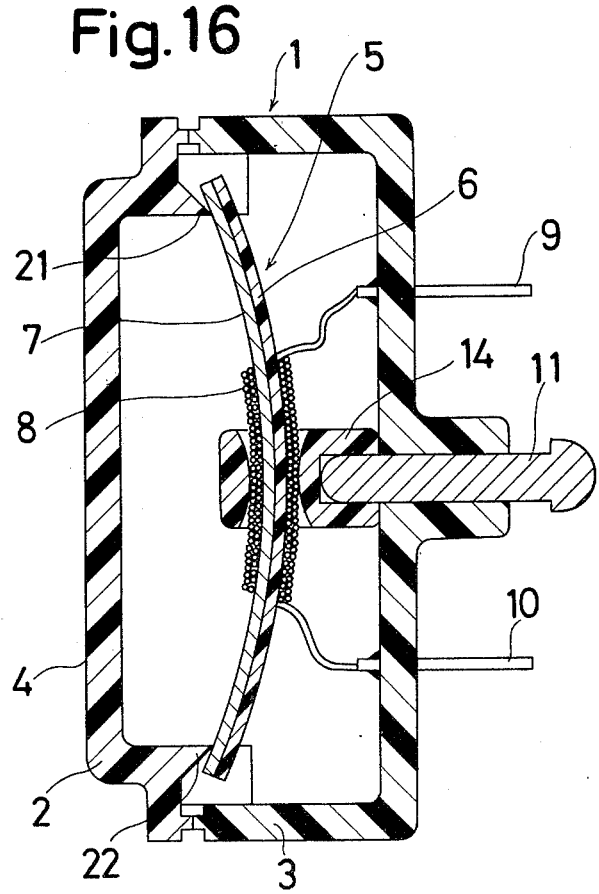
FIG. 16 is a longitudinal cross-sectional view of a position sensor according to a ninth embodiment of the invention.

Ninth Embodiment, FIG. 16

In the position sensor 1 shown in FIG. 16, a magnetically soft amorphous metal member 7 is integrally cemented on the concave side or the left side of an elastic member 6 which has a more accurate configuration than that shown in FIG. 16 under its free condition to thereby form a core 5. A coil 8 is wound on the magnetically soft amorphous metal member 7 of the core 5. When the movable member 11 is positioned as shown in FIG. 16, the intermediate portion of the core 5 is leftwardly displaced from its free condition by the engaging member 14 and deflected toward the flat condition as shown in FIG. 16. Accordingly, an initial tensile stress is produced in the magnetically soft amorphous metal member. When the movable member 11 is leftwardly displaced, the core 5 is deflected to its flat condition, whereby a tensile stress produced in the magnetically soft amorphous metal member 7 is increased from the initial tensile stress in response to the leftward displacement of the movable member 11. The use of the position sensor 1 shown in FIG. 16 in combination with the electrical processing circuits 100, 120 and 140 or the logical processing unit 160 provides an electrical signal corresponding to the displaced position of the movable member 11.

Figure 17:
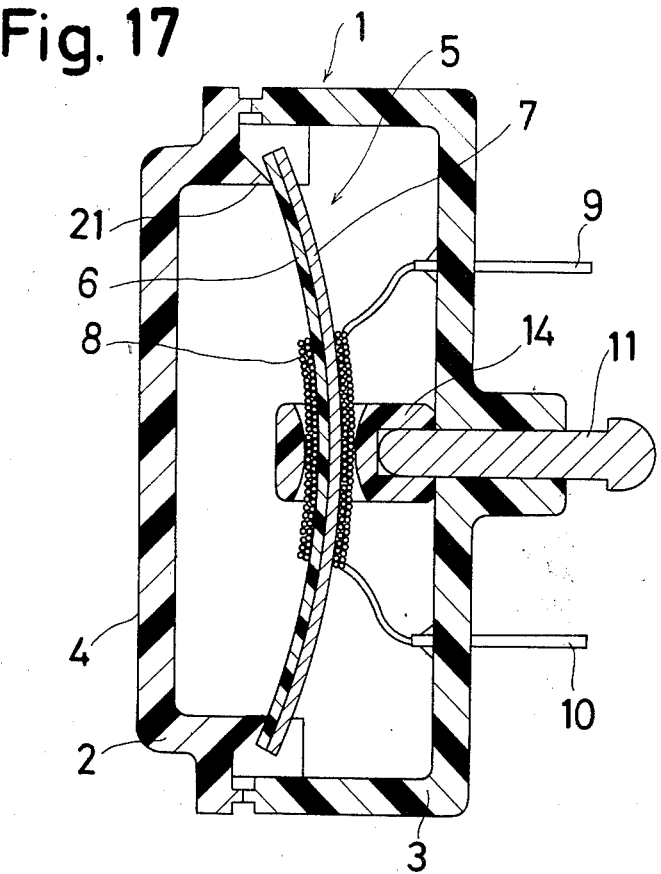
FIG. 17 is a longitudinal cross-sectional view of a position sensor according to a tenth embodiment of the invention.

Tenth Embodiment, FIG. 17

A position sensor 1 shown in FIG. 17 is different from the position sensor shown in FIG. 16 in that the magnetically soft amorphous metal member 7 is cemented on the convex side or right side of the elastic member 6 integrally therewith to thereby form a core 5 in the latter. In the arrangement, when the movable member 11 is positioned as shown in FIG. 17, the intermediate portion of the core 5 is leftwardly displaced from its free condition and deflected to its flat condition as shown in FIG. 17. Accordingly, an initial compressive stress is previously produced in the magnetically soft amorphous metal member 7. When the movable member 11 is leftwardly displaced, the core 5 is deflected to its flat condition, whereby a compressive stress produced in the magnetically soft amorphous metal member 7 is increased from the initial compressive stress in response to the leftward displacement of the movable member 11. The use of the position sensor 1 shown in FIG. 17 in combination with the electrical processing circuits 100, 120 and 140 or the logical processing unit 160 provides an electrical signal corresponding to the displaced position of the movable member 11.

Further, the position sensors shown in FIGS. 16 and 17 are suitable for producing an initial stress in the magnetically soft amorphous metal member and for using a high-linearity region of the electrical signal corresponding to the position detected to thereby provide a high-accuracy electrical signal.

Figure 18:
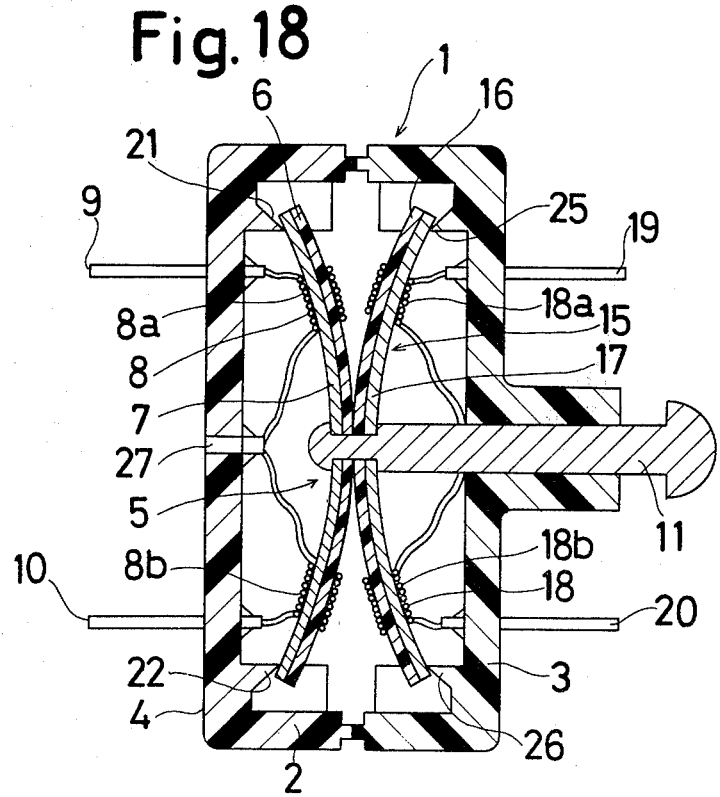
FIG. 18 is a longitudinal cross-sectional view of a position sensor according to an eleventh embodiment of the invention.

Eleventh Embodiment, FIG. 18

A position sensor 1 shown in FIG. 18 utilizes a pair of cores 5 and 15. These cores 5 and 15 comprise elastic members 6 and 16 such as epoxy resin, vinyl chloride resin or beryllium copper which have more arcuate configurations than those shown in FIG. 18 under those free conditions. Magnetically soft amorphous metal members 7 and 17 are cemented integrally on the concave sides of member 6 and 16, respectively. The cores 5 and 15, as shown in FIG. 18, are fixed to the left end of the movable member 11 with the intermediate portions of the elastic members 6 and 16 being set in contact with each other. The opposite ends of the core 5 are retained by knife-edged retaining portions 21 and 22 formed in a body 2 and the opposite ends of the core 15 are retained by knife-edged retaining portions 25 and 26 formed in the body 3. Since both the cores 5 and 15 are similarly deflected in the flat direction at the intermediate displaced position of the movable member 11 shown in FIG. 18, the same initial tensile stress is produced in each of the magnetically soft amorphous metal members 7 and 17. A coil 8 is wound on the core 5, the coil 8 incuding a coil 8a and a coil 8b connected in series therewith through a terminal 27. Both the coils 8a and 8b are wound in the same directions. A coil 18 is wound on the core 15, the coil 18 including a coil 18a and a coil 18b connected in series therewith. Both the coil 18a and 18b are wound in the same directions. When the movable member 11 is displaced leftwardly from the position shown in FIG. 18, the core 5 is deflected to its flat condition and the core 15 is returned to its free condition. Accordingly, a tensile stress produced in the magnetically soft amorphous metal member 7 of the core 5 is increased from the initial tensile stress in response to the leftward displacement of the movable member 11 and a tensile stress produced in the magnetically soft amorphous metal member 17 is decreased from the initial tensile stress in response to the leftward displacement of the movable member 11. On the contrary, when the movable member 11 is rightwardly displaced from the intermediate portion shown in FIG. 18, a tensile stress produced in the magnetically soft amorphous metal member 7 is decreased from the initial tensile stress and a tensile stress produced in the magnetically soft amorphous metal member 17 is increased from the initial tensile stress.

The use of the position sensor shown in FIG. 18 in combination with the electrical processing circuits 180 and 200 and the electronic processing unit 220 provides an electrical signal corresponding to the displaced position of the movable member 11.

Figure 19:
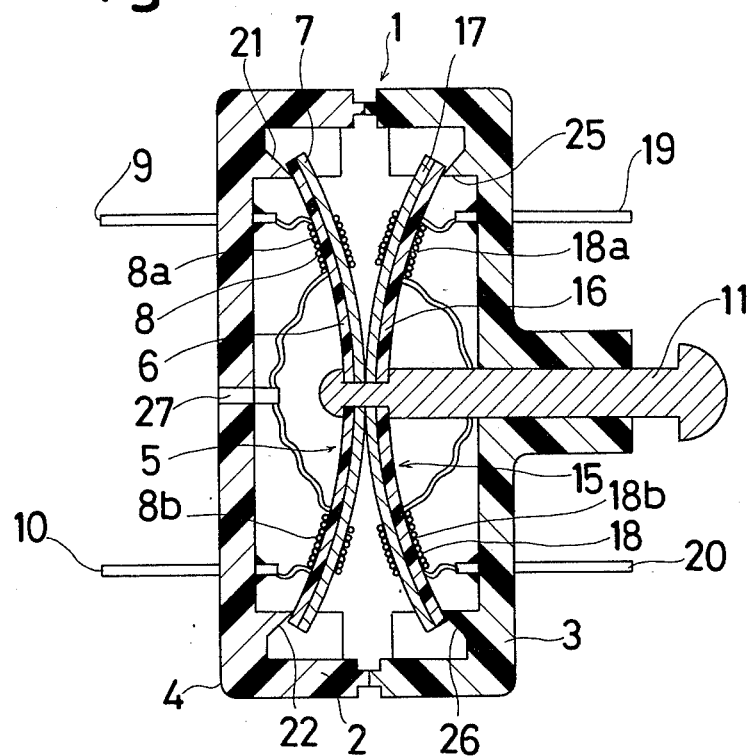
FIG. 19 is a longitudinal cross-sectional view of a position sensor according to a twelfth embodiment of the invention.

Twelfth Embodiment, FIG. 19

A position sensor 1 shown in FIG. 19 is different from the position sensor shown in FIG. 18 in that the magnetically soft amorphous metal member 7 and 17 are integrally cemented on the convex sides of the elastic members 6 and 16 to form the cores 5 and 15 respectively in the latter. In the arrangement, when a movable member 11 is at the intermediate position shown in FIG. 19, the same initial compressive stress is produced in each of the magnetically soft amorphous metal members 7 and 17. When the movable body is displaced leftwardly from the position shown in FIG. 19, the core 5 is deflected to its flat condition and the core 15 is returned to its free condition. Accordingly, a compressive stress produced in the magnetically soft amorphous metal member 7 of the core 5 is decreased from the initial compressive stress in response to the leftward displacement of the movable member 11 and a compressive stress produced in the magnetically soft amorphous metal member 17 of the core 15 is increased from the initial compressive stress in response to the leftward displacement. On the contrary, when the movable member 11 is rightwardly displaced from its intermediate position shown in FIG. 19, a compressive stress produced in the magnetically soft amorphous metal member 7 is increased from the initial compressive stress and a compressive stress produced in the magnetically soft amorphous metal member 17 is decreased from the initial compressive stress.

The use of the position sensor shown in FIG. 19 in combination with the electrical processing circuits 180 and 200, and the logical processing unit 220 shown in FIGS. 10a, 10b and 10c provides an electrical signal corresponding to the displaced position of the movable member 11.

The position sensors shown in FIGS. 9, 11, 18 and 19 utilize a pair of cores including magnetically soft amorphous metal member, one of which produces the increased stress in response to the displaced position detected, and the other of which produces the decreased stress in response to the displaced position detected to detect the difference in variations of permeability by variations of stress of both the magnetically soft amorphous metal member, whereby a signal is amplified in response to the variations of permeability. In addition, even if an external magnetic field is applied during detecting operation, the variations in permeability of the magnetically soft amorphous metal member by the external magnetic field is cancelled and therefore no influence is caused by the external magnetic field.

Figure 20:
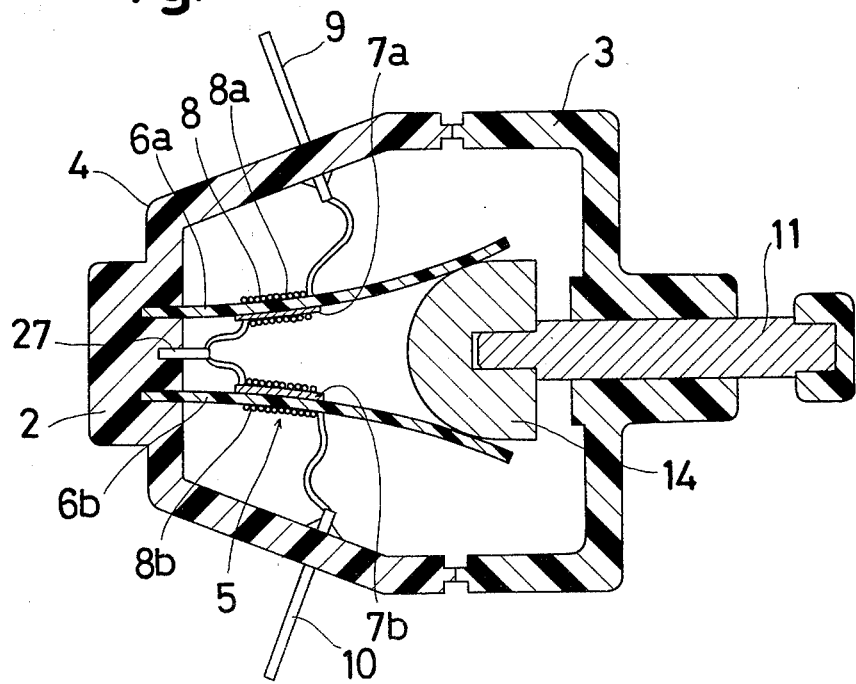
FIG. 20 is a longitudinal cross-sectional view of a position sensor according to a thirteenth embodiment of the invention.

Thirteenth Embodiment, FIG. 20

In a position sensor of FIG. 20, elastic members 6a and 6b are disposed symmetrically and have ends fixed to the body 2 respectively. A magnetically soft amorphous metal member 7 comprises a pair of magnetically soft amorphous metal members 7a and 7b integrally cemented on the lower side of the elastic member 6a and the upper side of the elastic member 6b, respectively, to thereby form a core 5. A coil 8 includes a pair of coils 8a and 8b. The coil 8a is wound on the magnetically soft amorphous metal member 7a and the coil 8b is wound on the magnetically soft amorphous metal member 7b. The coil 8b is connected in series with the coil 8b through the terminal 27 and wound in the direction opposite to that of the coil 8a. An engaging member 14 which is fixed to the movable member 11 is positioned at the other ends of the elastic members 6a and 6b, whereby the other ends of the elastic members 6a and 6b are deflected apart in a direction whereby they are opened. Accordingly, a tensile stress is produced in each of the magnetically soft amorphous metal members 7a and 7b. The tensile stress is increased in response to the leftward displacement of the movable member 11. In this manner, the coils 7a and 7b which are wound on the magnetically soft amorphous metal member changed in stress are so arranged that one of the coils is connected in series with the other coil wound in the direction opposite to that thereof, such that an external magnetic field is thereby cancelled even if it is applied, whereby a high-accuracy electrical signal is obtained according to the detected position. The use of the position sensor 1 shown in FIG. 20 in combination with the electrical processing circuits 100, 120 and 140 or the logical processing unit 160 provides an electrical signal corresponding to the detected position.

Figure 21:
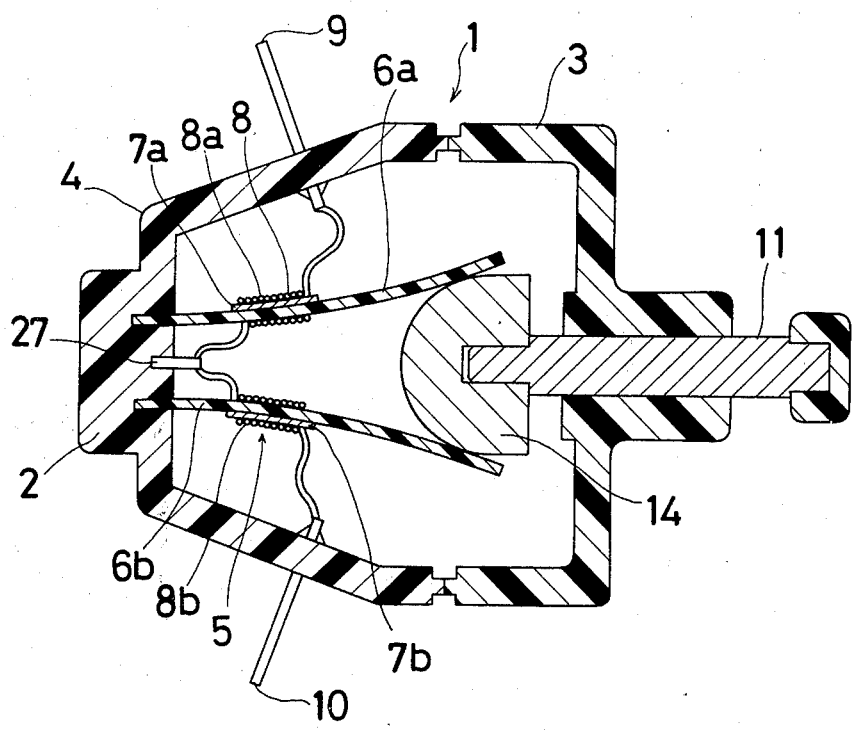
FIG. 21 is a longitudinal cross-sectional view of a position sensor according to a fourteenth embodiment of the invention.

Fourteenth Embodiment, FIG. 21

A position sensor 1 shown in FIG. 21 is different from the position sensor shown in FIG. 21 in that magnetically soft amorphous metal members 7a and 7b are integrally cemented on the upper side of an elastic member 6a and the lower side of an elastic member 6b to thereby forming a core 5 in the latter. In the arrangement, a compressive stress is produced in each of the magnetically soft amorphous metal members 7a and 7b, and the compressive stress is increased in response to the leftward displacement of the movable member 11. The use of the position sensor 1 shown in FIG. 21 in combination with the electrical processing circuits 100, 120 and 140 or the logical processing unit 160 provides an electrical signal corresponding to the position detected. The operative device connected to the movable body in each of the embodiments above described may comprise an operatively displaced member such as an output rod of an actuator.

Having now fully set forth both the structure and operation of preferred embodiments of the concept underlying the present invention, various other embodiments as well as certain variations and modifications of the embodiments herein shown and described will obviously occur to those skilled in the art. It is to be understood, therefore, that within the scope of the appended claims, the inventions may be practised otherwise than as specifically set forth herein.

What is claimed as new and desired to be secured by Letters Patent of the United States is;

1. A position sensor for detecting displacement of an operative device, comprising:
    a movable member coupled to said operative device;
    core means including a magnetically soft amorphous metal member in which is produced a stress in response to the displacement of said movable member and an elastic member operatively connected to said movable member, said magnetically soft amorphous metal member being cemented integrally on a surface of said elastic member;
    electrical coil means including at least one coil wound on said core means for sensing a change in permeability of said magnetically soft amorphous metal member as produced by said displacement responsive stress;
    means for applying an electrical signal to said coil to saturate magnetically said core means; and
    means for producing a displacement output signal indicative of the displacement of said operative device based on the amount of time between application of said electrical signal and saturation of said core means.

2. A position sensor according to claim 1, further comprising:
    an engaging member fixed to said movable member, said engaging member being connected to the magnetically soft amorphous metal member of said core means.

3. A position sensor according to claim 1, further comprising:
    said movable member including a cam surface coupled to said magnetically soft amorphous member of said core means.

4. A position sensor according to claim 1, further comprising:
    said movable member provided with means for producing an initial stress in the magnetically soft amorphous metal member of said core means.

5. A position sensor according to claim 4, further comprising:
    said core means comprising a pair of the magnetically soft amorphous metal members disposed in opposition to each other, one of the magnetically soft amorphous metal materials undergoing an increasing stress while the other undergoing a decreasing stress in response to displacement of the movable member.

* * * * *